UNITED STATES PATENT OFFICE.

ARTHUR GEORGE GREEN, OF HEATON MOOR, AND ALEXANDER MEYENBERG, OF MANCHESTER, ENGLAND.

BLACK SULFUR DYE.

SPECIFICATION forming part of Letters Patent No. 641,589, dated January 16, 1900.

Application filed September 29, 1899. Serial No. 732,075. (Specimens.)

*To all whom it may concern:*

Be it known that we, ARTHUR GEORGE GREEN, F. I. C., F. C. S., a subject of the Queen of Great Britain and Ireland, residing at 13 King's Drive, Heaton Moor, near Stockport, and ALEXANDER MEYENBERG, Ph..D., a subject of the Emperor of Germany, residing at 13 Nelson street, Ardwick, Manchester, England, have invented certain new and useful Improvements in New Black Coloring-Matter; and we do hereby declare the following to be a full, clear, and exact description of the invention, such as will enable others skilled in the art to which it appertains to make and use the same.

This invention (for which Letters Patent have been applied for in England dated March 7, 1899; in Germany dated May 24, 1899, and in France dated May 3, 1899) refers to the production of a new black coloring-matter containing sulfur and capable of dyeing unmordanted cotton from an alkaline sulfid bath in fast-black shades which withstand the action of acids, alkalies, boiling, soap, light, and air to a remarkable degree.

The coloring-matter is produced by conjoint oxidation of paratolylenediamin $C_6H_3(CH_3)(NH_2)_2$ (1:2:5) with an amin of the benzene series containing a free para position to the amido group, (such, for instance, as anilin, orthotoluidin, or paraxylidin,) in presence of thiosulfuric acid, under the influence of which sulfur is introduced into the new compound. The product is a black powder insoluble in water and in carbonated alkalies, but dissolving in alkaline sulfids or sulfites to a dark solution. In concentrated sulfuric acid it dissolves sparingly, forming a blue-black solution. By reducing agents, such as zinc powder and caustic soda, it is converted into a leuco compound, which on exposure to air rapidly reoxidizes.

Example: A solution of thirty and one-half pounds paratolylenediamin in twenty-two gallons of water and three gallons of hydrochloric acid (twenty-seven per cent. HCl) is mixed with a solution of thirty-two pounds of anilin hydrochlorid or thirty-six pounds of orthotoluidin hydrochlorid in twenty gallons of water. Into this mixture one hundred and twenty-five pounds of crystallized sodium thiosulfate (hyposulfite of soda) $Na_2S_2O_3 + 5H_2O$ are stirred, and when dissolved there is run in a solution of one hundred pounds of sodium bichromate in fifteen gallons of water, acidified with forty-five pounds of concentrated sulfuric acid. During the reaction the temperature of the liquid is kept at from 0° to 5° centigrade by the addition of ice. After standing for some time one hundred pounds of concentrated sulfuric acid diluted with fifteen gallons of water are added and the solution is boiled for an hour. The precipitated coloring-matter is filtered off, washed with water, and dried. The product is a black insoluble powder, which is rendered soluble by treatment with alkaline sulfids or sulfites. From a bath containing sodium sulfid it dyes cotton a deep fast black, the fastness of which is still further increased by subsequent passage through a bath containing a bichromate or a salt of copper.

The shade of the coloring-matter can be modified by varying the proportion of thiosulfate employed. By diminishing the thiosulfate the shade becomes brownish-black and by increasing it it becomes greenish-black, the bichromate being simultaneously varied.

The process which we have described above for obtaining the product of our present invention forms the subject of an application for a patent filed by us July 21, 1899, Serial No. 724,709.

Having now particularly described and ascertained the nature of our said invention and in what manner the same is to be performed, we declare that what we claim is—

As a new product and a new article of manufacture the coloring-matter hereinbefore described derived from paratolylenediamin and which forms a black powder insoluble in water dilute acids or alkaline carbonates but readily soluble in alkaline sulfids, slightly soluble in concentrated sulfuric acid with blue-black color; and which, by reducing agents, is converted into a readily-oxidizable leuco compound; and which dyes unmordanted cotton direct a deep black from a bath containing sodium sulfid.

In testimony whereof we affix our signatures in presence of two witnesses.

ARTHUR GEORGE GREEN.
ALEXANDER MEYENBERG.

Witnesses:
ERNALD SIMPSON MOSELEY,
ARTHUR VERNON BATHO.